(12) United States Patent
Choi et al.

(10) Patent No.: US 12,112,654 B2
(45) Date of Patent: Oct. 8, 2024

(54) REMOTE TRAINING METHOD AND APPARATUS FOR DRONE FLIGHT IN MIXED REALITY

(71) Applicant: INDUSTRY ACADEMY COOPERATION FOUNDATION OF SEJONG UNIVERSITY, Seoul (KR)

(72) Inventors: Soo Mi Choi, Seoul (KR); Yong Guk Go, Namyangju-si (KR); Ho San Kang, Seoul (KR); Jong Won Lee, Seoul (KR); Mun Su Yu, Goyang-si (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 813 days.

(21) Appl. No.: 17/218,935

(22) Filed: Mar. 31, 2021

(65) Prior Publication Data
US 2022/0293001 A1 Sep. 15, 2022

(30) Foreign Application Priority Data
Mar. 10, 2021 (KR) .......................... 10-2021-0031318

(51) Int. Cl.
*G09B 9/48* (2006.01)
*B64C 39/02* (2023.01)
(Continued)

(52) U.S. Cl.
CPC .............. *G09B 9/48* (2013.01); *B64C 39/024* (2013.01); *G06F 3/011* (2013.01);
(Continued)

(58) Field of Classification Search
CPC . G09B 9/02; G09B 9/003; G09B 9/08; G09B 9/48; G06F 3/011
See application file for complete search history.

(56) References Cited

U.S. PATENT DOCUMENTS 10,403,165 B2 * 9/2019 Hales ....................... G09B 9/48
10,684,678 B1 * 6/2020 Choi ....................... G06T 7/593
(Continued)

FOREIGN PATENT DOCUMENTS

JP 2021-018080 A 2/2021
KR 10-2017-0138752 A 12/2017
(Continued)

*Primary Examiner* — Kurt Fernstrom

(57) ABSTRACT

A remote training apparatus for a drone flight in a mixed reality includes: a processor; and a memory, wherein the memory stores program instructions executable by the processor to generate a virtual flight space using arrangement information of one or more anchors and tags arranged in a physical space for the flight of the drone, and receive and register a flight training scenario generated in the virtual flight space from a second computer belonging to a remote expert group that remotely communicates with a first computer belonging to a drone operator group, wherein the flight training scenario includes one or more virtual obstacles and one or more flight instruction commands, and at least some of the flight instruction commands are mapped to the one or more virtual obstacles, and receive one or more annotations generated by the remote expert group from the second computer to transmit the annotations to the first computer.

12 Claims, 14 Drawing Sheets

(51) Int. Cl.
  *G06F 3/01*      (2006.01)
  *G06F 3/04817*   (2022.01)
  *G09B 9/30*      (2006.01)
  *B64U 101/30*    (2023.01)

(52) U.S. Cl.
  CPC ......... *G06F 3/04817* (2013.01); *G09B 9/307* (2013.01); *B64U 2101/30* (2023.01); *B64U 2201/20* (2023.01)

(56) References Cited

U.S. PATENT DOCUMENTS

| | | | |
|---|---|---|---|
| 10,744,418 B2* | 8/2020 | Yanagisawa | G05D 1/0022 |
| 11,074,827 B2* | 7/2021 | Choi | G05D 1/0038 |
| 11,132,915 B1* | 9/2021 | McIver | G06F 3/011 |
| 11,352,135 B2* | 6/2022 | McLean | G06T 19/006 |
| 2016/0091894 A1* | 3/2016 | Zhang | G05D 1/0044 |
| | | | 701/2 |
| 2017/0069218 A1* | 3/2017 | Shin | G05D 1/0016 |
| 2021/0335145 A1* | 10/2021 | Denn | G02B 27/017 |
| 2022/0068155 A1* | 3/2022 | Nakazawa | G09B 9/085 |

FOREIGN PATENT DOCUMENTS

| | | |
|---|---|---|
| KR | 10-2148103 B1 | 8/2020 |
| KR | 10-2216312 B1 | 2/2021 |

* cited by examiner

[FIG. 1]
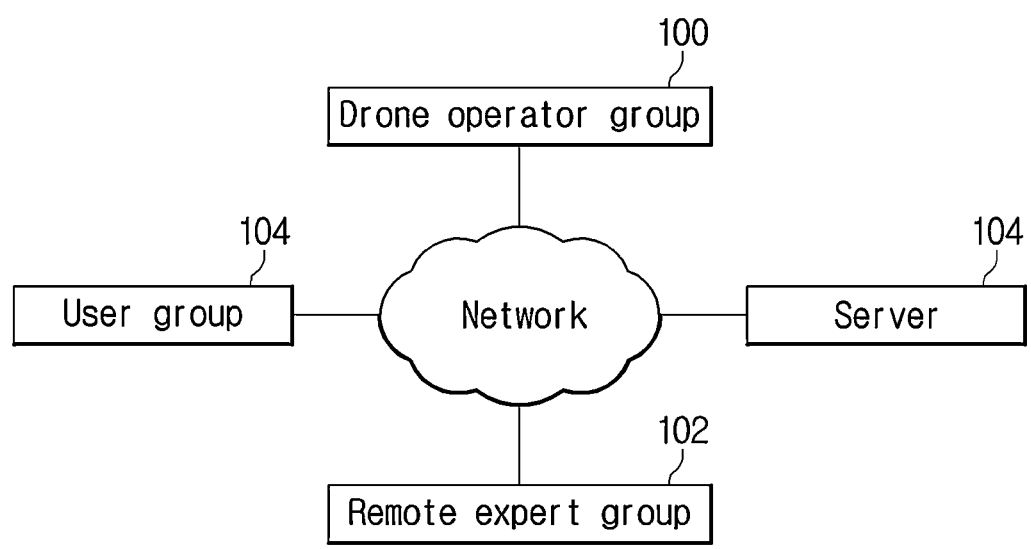

[FIG. 2]
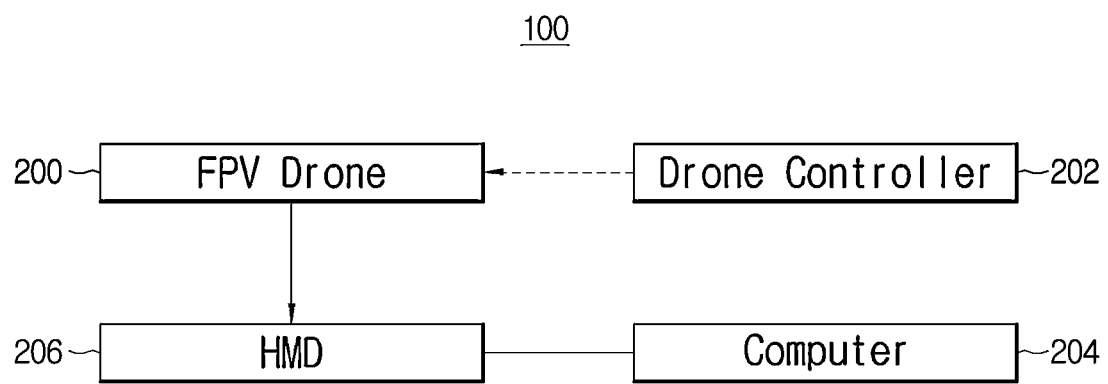

[FIG. 3]
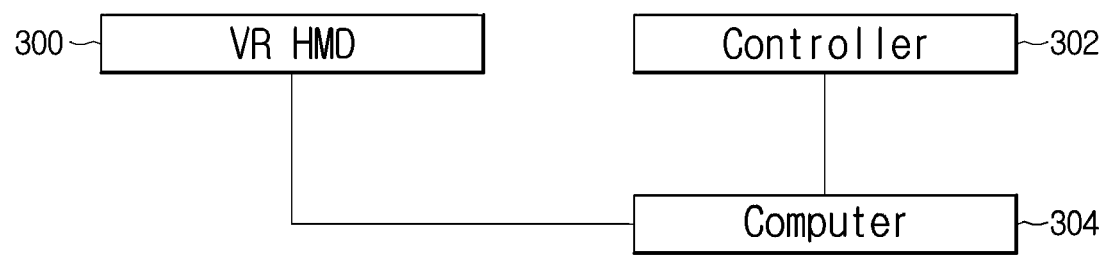

[FIG. 4]
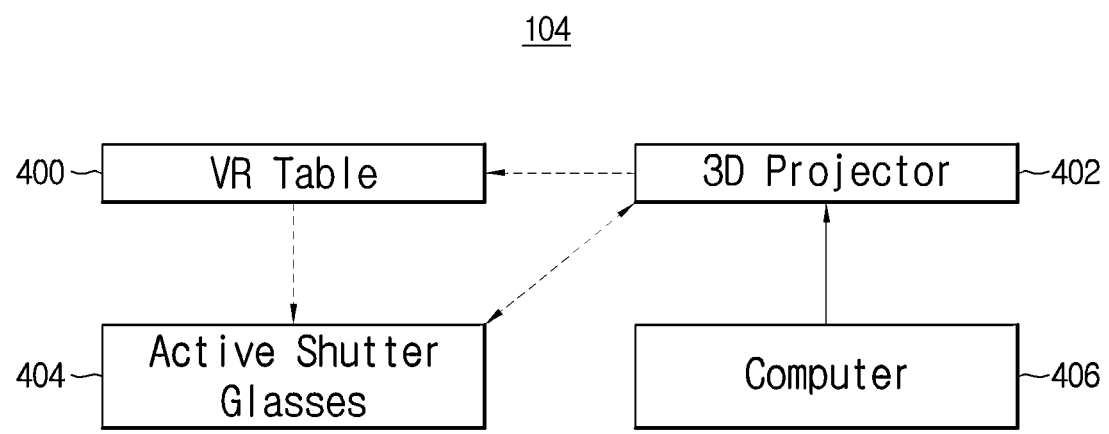

[FIG. 5]
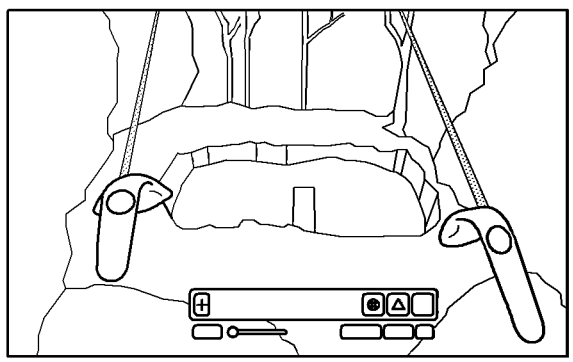
(a) TPV
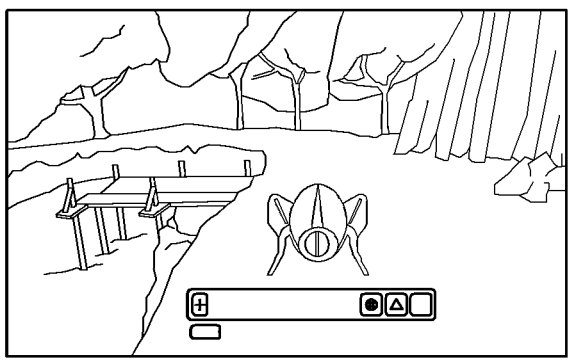
(b) Drone
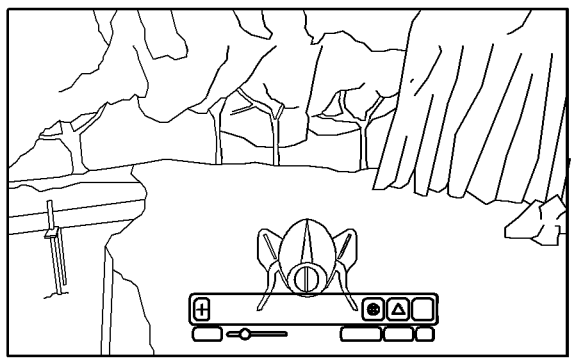
(c) FPV-Near
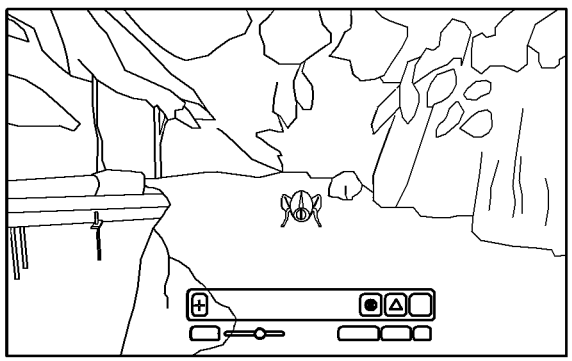
(d) FPV-Far

[FIG. 6]
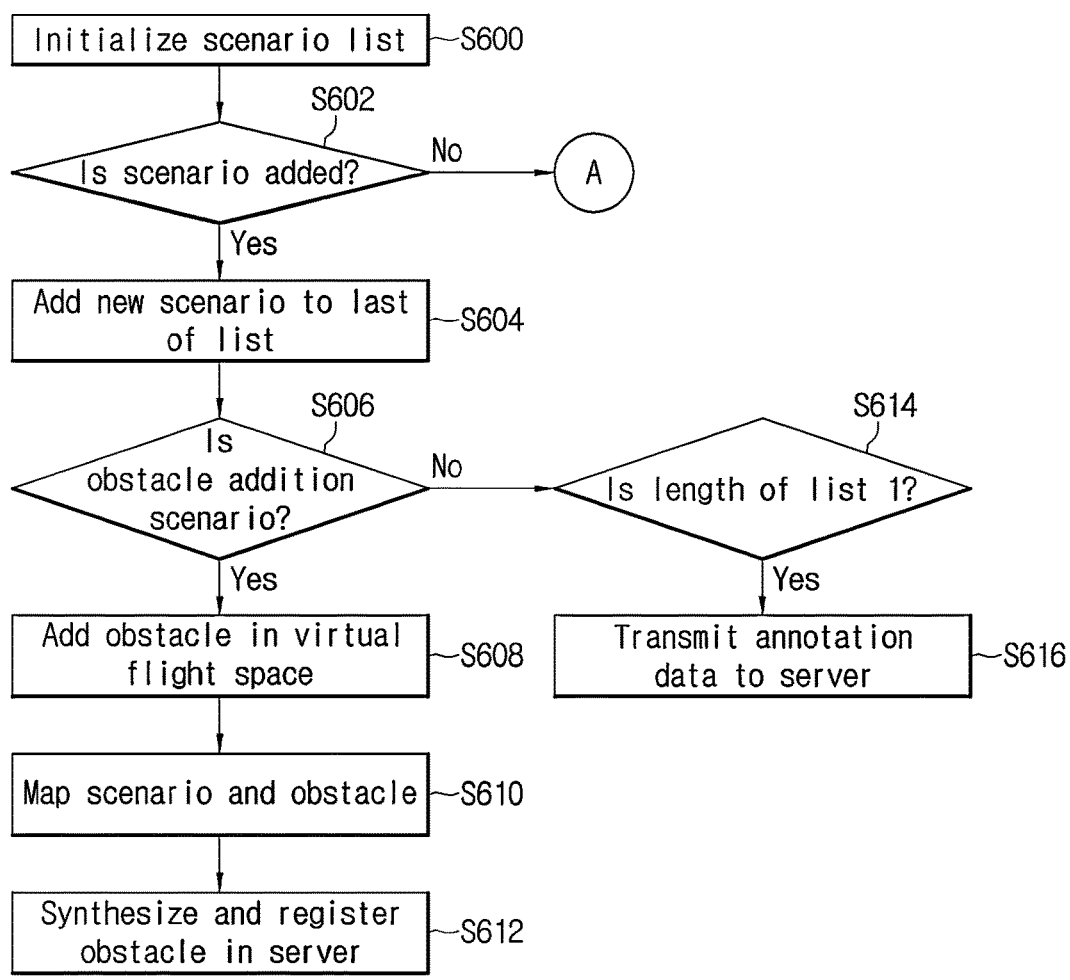

[FIG. 7]
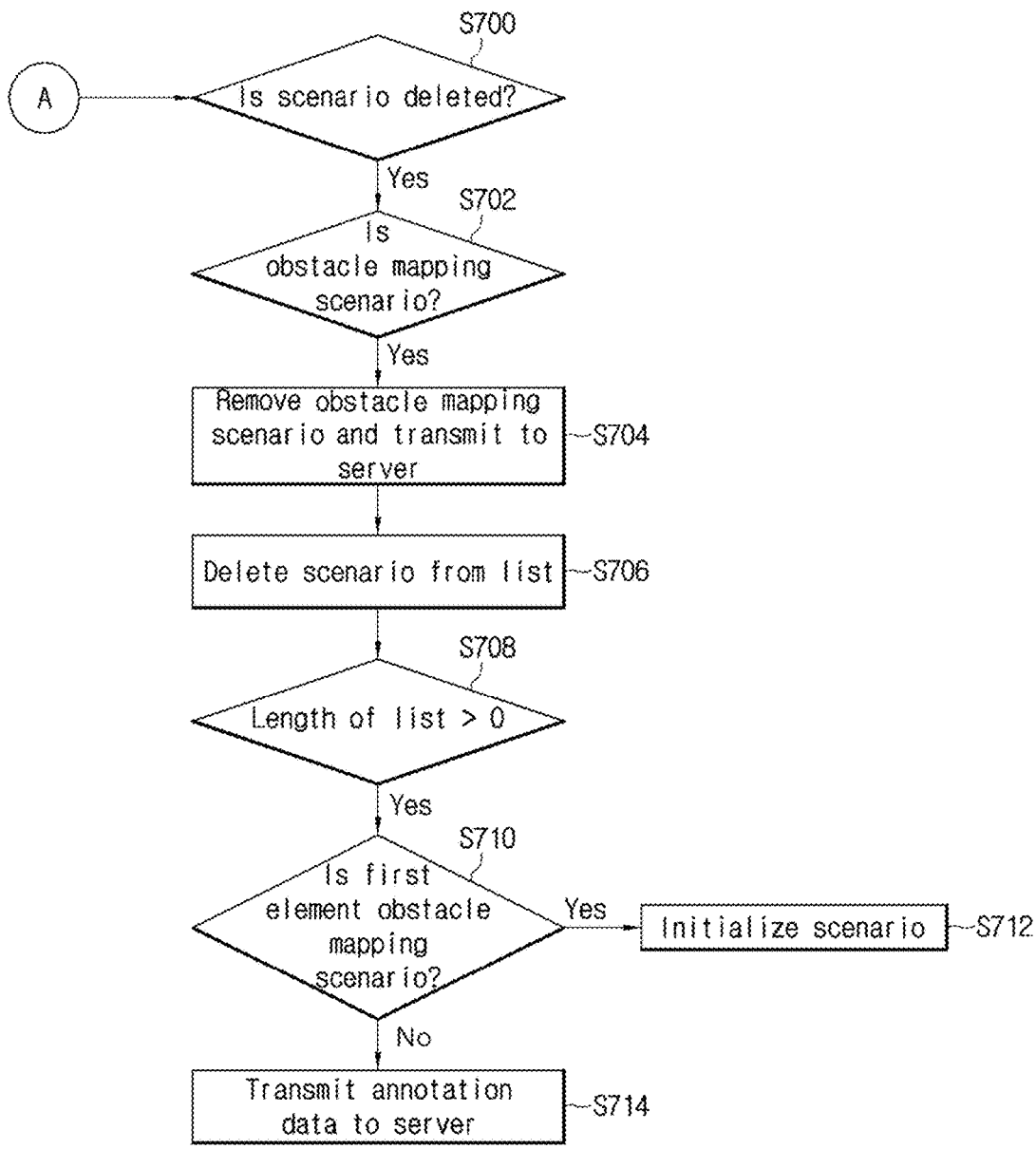

[FIG. 8]
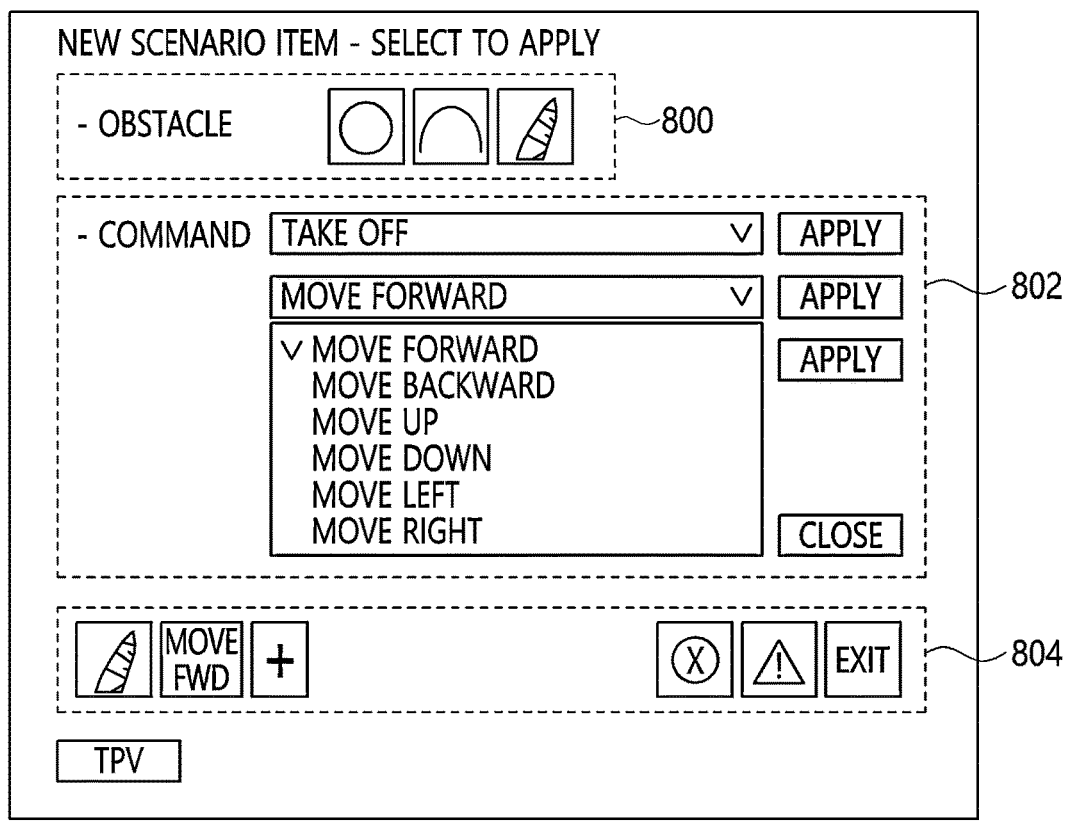

[FIG. 9]

```
Algorithm Configuration of flight training scenario using algorithm extension tool
list: Flight training scenario list
ins: Newly adding scenario object    (ins ∈ list)
rmv: Scenario object removed from list    (rmv ∈ list)

procedure ScenarioConfiguration
  initialize list, e, o
  for each frame do
    if input ins then
      e ← insert(list, ins)
      if e ∈ obstacles then
        o ← initializeObstacle(e)
        setMapping(e, o)
        syncObstacle(o)
      else if getLength(list) = 1
        then sendAnnotation(e)
      end if
    end if
    if input rmv then
      if rmv ∈ obstacles then
        o ← getMapping(rmv)
        destroyObstacle(o)
      end if
      remove(list, rmv)
      if getLength(list) > 0 then
        e ← getFirstElem(list)
        if e ∈ obstacles then
          sendAnnotation(e)
        end if
      else
        clear()
      end if
    end if
  end for
end procedure
```

[FIG. 10]
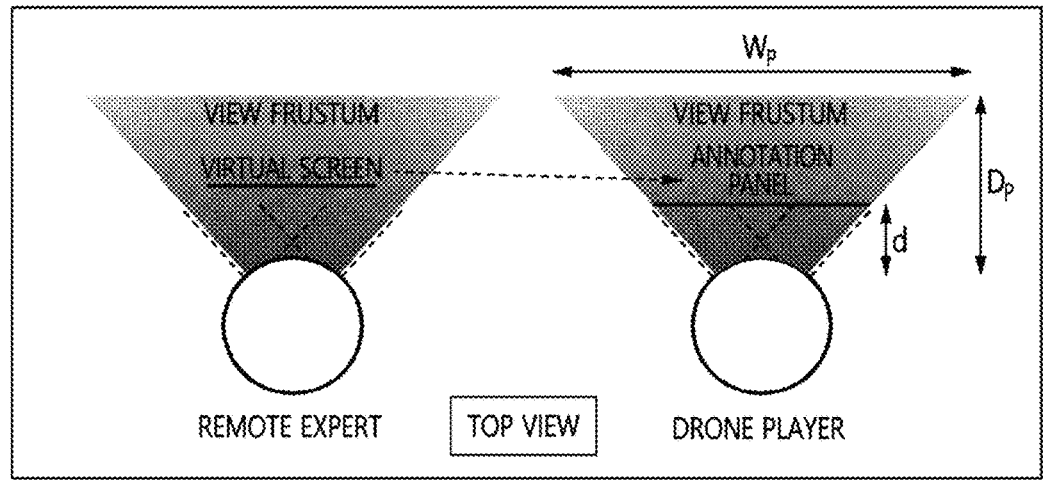
(a)
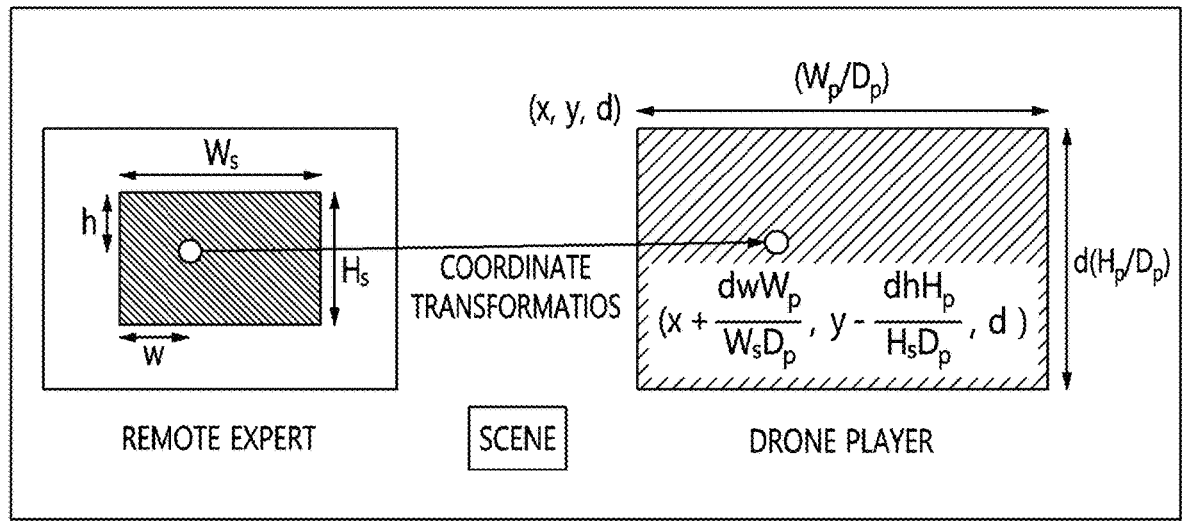
(b)

[FIG. 11]
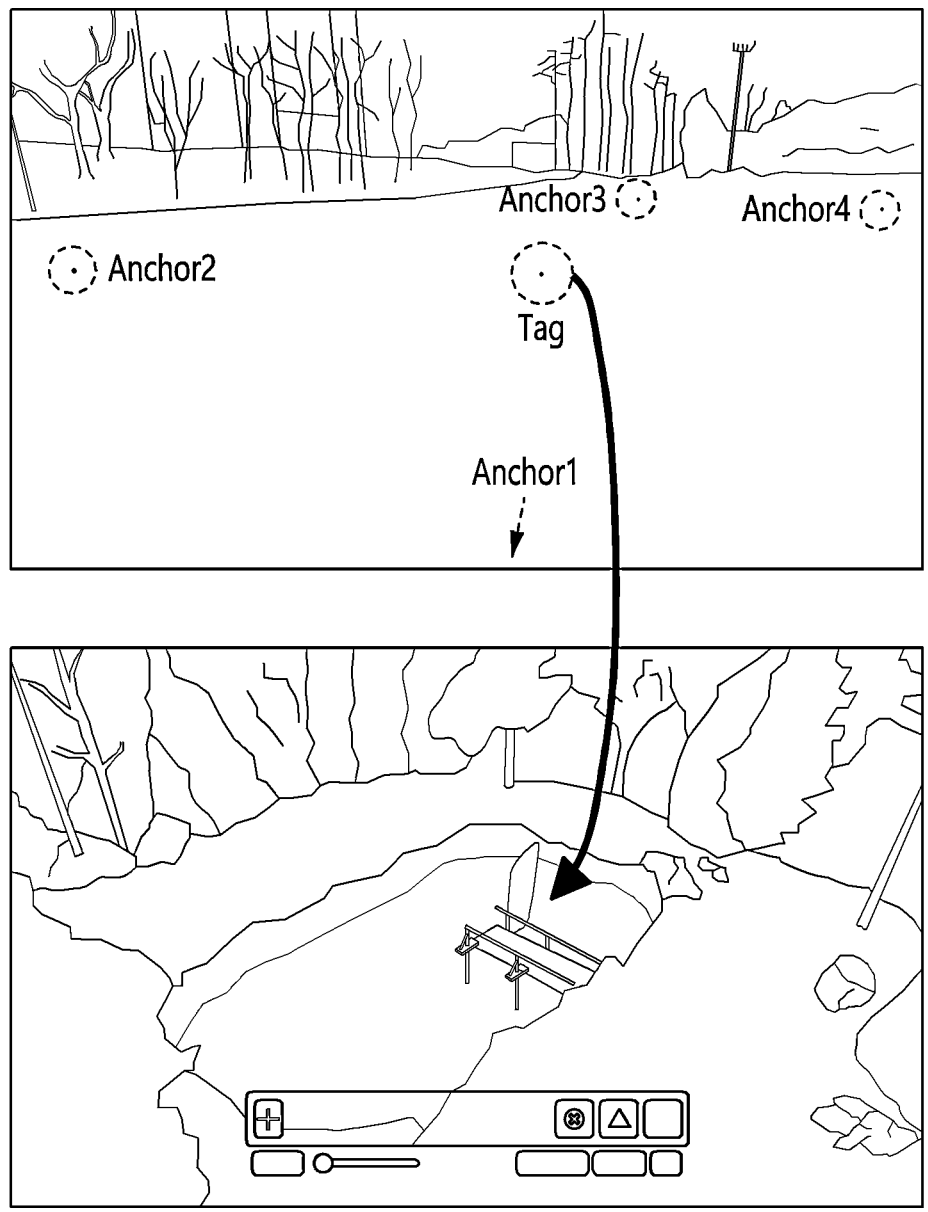

[FIG. 12]
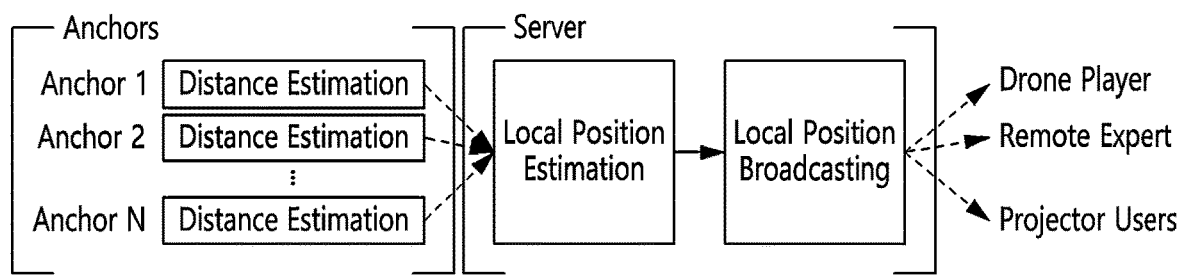

[FIG. 13]
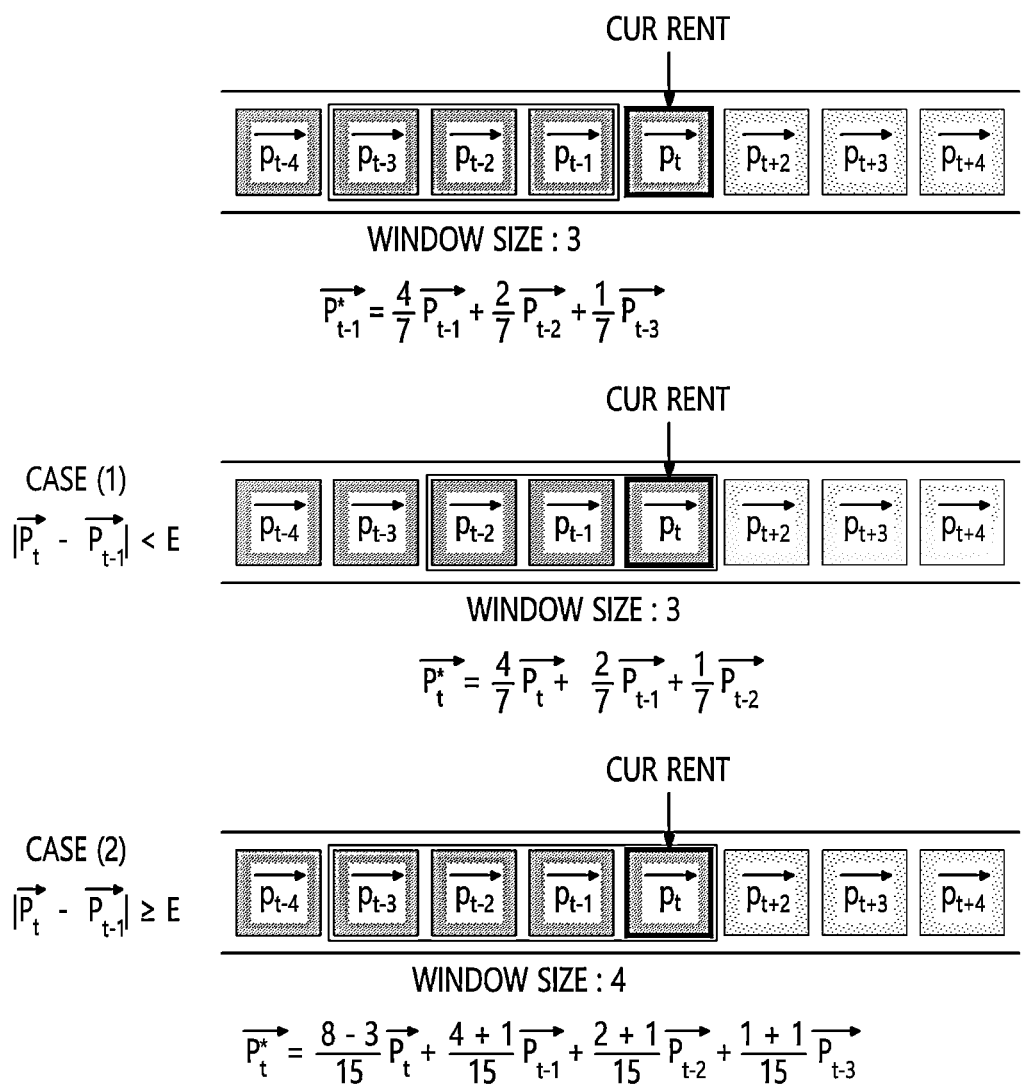

[FIG. 14]
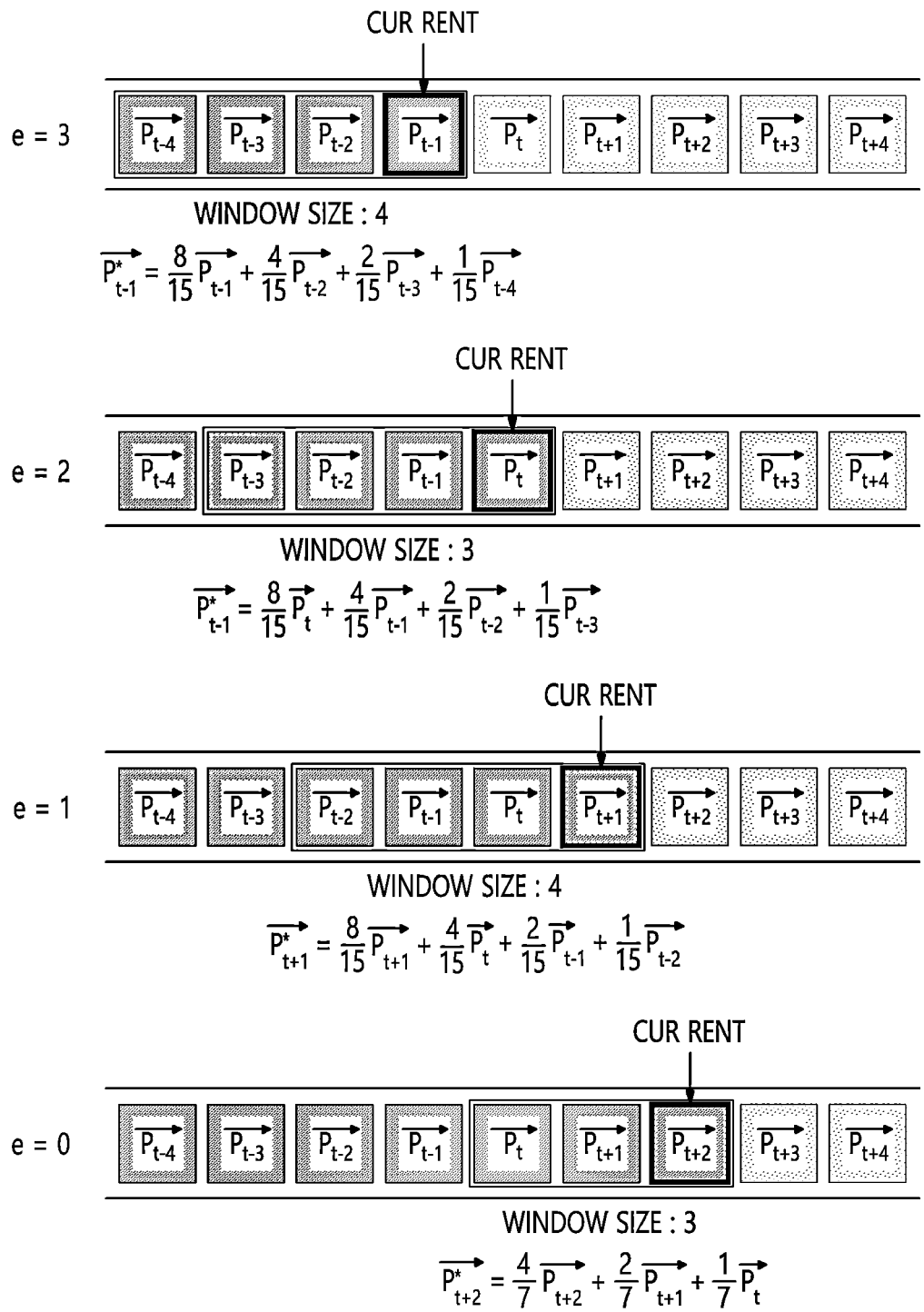

REMOTE TRAINING METHOD AND APPARATUS FOR DRONE FLIGHT IN MIXED REALITY

CROSS-REFERENCE TO RELATED APPLICATION

This present application claims priority under 35 U.S.C. § 119(a) to Korean Patent Application No. 10-2021-0031318 filed in the Korean Intellectual Property Office on Mar. 10, 2021, the entire contents of which are incorporated herein by reference.

BACKGROUND

(a) Technical Field

The present disclosure relates to remote training method and apparatus for drone flight in a mixed reality.

(b) Background Art

With the development of an unmanned aerial vehicle industry, research and development on services and applications using drones are on the rise, and in various industries including entertainment, there are increasing attempts to solve operations that were difficult to be performed by conventional methods using drones. In addition, due to the spread of relatively inexpensive small drones, there are many cases in which ordinary people without drone operation licenses operate drones. Due to these changes, more people may access and operate drones than before.

Unlike a general drone flight, a first-person view (FPV) drone flight is a method that is operated by viewing an image transmitted from a camera mounted on the body of the drone.

Since an operator cannot directly check the drone in flight and depends on a field of view of the camera mounted on the drone, the difficulty of operation is relatively high, and a lot of flight control experience is required.

Since beginners who are inexperienced in operating the FPV drone flight are highly likely to cause various damages such as damage to the body of the drone or injuring others due to manipulation by incorrect situation judgment, there is a need for an environment in which flight control can be safely practiced by an expert in charge of flight guidance.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

In order to solve the problems of the related art, an object of the present disclosure is to provide remote training method and apparatus for drone flight in a mixed reality capable of providing a safe and realistic drone flight guidance.

According to an aspect of the present disclosure, there is provided a remote training apparatus for a drone flight in a mixed reality including: a processor; and a memory including the processor, wherein the memory stores program instructions executable by the processor to generate a virtual flight space using arrangement information of one or more anchors and tags arranged in a physical space for the drone flight, and receive and register a flight training scenario generated in the virtual flight space from a second computer belonging to a remote expert group that remotely communicates with a first computer belonging to a drone operator group, wherein the flight training scenario includes one or more virtual obstacles and one or more flight instruction commands, and at least some of the flight instruction commands are mapped to the one or more virtual obstacles, and receive one or more annotations generated by the remote expert group from the second computer to transmit the one or more annotations to the first computer.

The one or more anchors may set a boundary of the virtual flight space, and the one or more tags may correspond to the one or more virtual obstacles.

The first computer may communicate with a first-person view (FPV) drone equipped with a stereo camera and a head mounted display for providing a mixed reality environment of a drone view to the drone operator group.

The second computer may communicate with a head-mounted display for providing a mixed reality environment of a drone view to the remote expert group and a controller for generating the flight training scenario and the one or more annotations, and provide a user interface for generating the flight training scenario and the one or more annotations.

The user interface may include one or more icons corresponding to the one or more virtual obstacles, a flight instruction selection area, and a scenario list area including a virtual obstacle and a flight instruction command selected by the remote expert group.

The one or more anchors and tags may be ultra-wideband sensors, and the program instructions may estimate position vectors of the tags in the virtual flight space at a preset time period, and correct the position vectors by using a variable length sliding window and a modified weighted moving average.

When a difference in size between the position vectors in adjacent periods to each other is less than a preset threshold value, the program instructions may correct the position vector by performing a weighted moving average of only one or more previous position vectors while maintaining the same size of the window as before.

When a difference in size between the position vectors is greater than a preset threshold value, the program instructions sequentially may increase size of the window and perform a weighted moving average of current position vector and one or more previous position vectors to correct the position vectors.

The program instructions may determine weight of the current position vector to be equal to or smaller than weight of the previous position vector.

When a case where the difference in size between the position vectors in adjacent periods to each other is less than the preset threshold value occurs for a predetermined time period or more, the program instructions may sequentially decrease the increased size of the window.

According to another aspect of the present disclosure, there is provided a remote training method for a drone flight in a mixed reality in an apparatus including a processor and a memory, the remote training method comprising the steps of: generating a virtual flight space using arrangement information of one or more anchors and tags arranged in a physical space for the drone flight; receiving and registering a flight training scenario generated in the virtual flight space from a second computer belonging to a remote expert group that remotely communicates with a first computer belonging to a drone operator group; and receiving one or more annotations generated by the remote expert group from the second computer to transmit the annotations to the first computer, wherein the flight training scenario includes one or more virtual obstacles and one or more flight instruction commands, and at least some of the flight instruction commands are mapped to the one or more virtual obstacles.

According to yet another aspect of the present disclosure, there is provided a non-transitory computer readable recording medium performing the method.

According to the present disclosure, there is an advantage capable of efficiently performing drone flight training according to a flight training scenario and an annotation generated by a remote expert.

It should be understood that the effects of the present disclosure are not limited to the effects described above, but include all effects that can be deduced from the detailed description of the present disclosure or configurations of the disclosure described in appended claims.

BRIEF DESCRIPTION OF THE DRAWINGS

FIG. 1 is a diagram illustrating a remote training system for drone flight in a mixed reality according to a preferred embodiment of the present disclosure.

FIG. 2 is a diagram illustrating a configuration of a drone operator group according to an embodiment.

FIG. 3 is a diagram illustrating a configuration of a remote expert group according to an embodiment.

FIG. 4 is a diagram illustrating a configuration of a projector user group according to an embodiment.

FIG. 5 is a diagram illustrating an example of a view change according to an embodiment.

FIG. 6 is a diagram illustrating a process of configuring a flight training scenario according to an embodiment.

FIG. 7 is a diagram illustrating a process of deleting and initializing the flight training scenario according to an embodiment.

FIG. 8 is a diagram illustrating a process of generating a flight instruction scenario using a VR controller according to an embodiment.

FIG. 9 is a pseudo code illustrating a process of generating a flight training scenario and adding an object according to an embodiment of the present disclosure.

FIG. 10 is a diagram illustrating that planar coordinates on a virtual screen are converted into appropriate 3D spatial coordinates in consideration of a view frustum visible on an HMD of a drone operator.

FIG. 11 is a diagram illustrating a state in which ultra-wideband sensors according to an embodiment are arranged in a physical space.

FIG. 12 is a diagram illustrating an overall pipeline configuring a virtual flight space by arranging ultra-wideband sensors in a physical space according to an embodiment.

FIGS. 13 to 14 are diagrams illustrating a sliding window operation process for correcting a position vector of a tag according to an embodiment.

DETAILED DESCRIPTION

The present disclosure may have various modifications and various embodiments and specific embodiments will be illustrated in the drawings and will be described in detail.

However, the present disclosure is not limited to specific embodiments, and it should be understood that the present disclosure covers all modifications, equivalents and replacements included within the idea and technical scope of the present disclosure. In describing each drawing, like reference numerals have bee used for like components.

FIG. 1 is a diagram illustrating a remote training system for drone flight in a mixed reality according to a preferred embodiment of the present disclosure.

As illustrated in FIG. 1, the remote training system according to an embodiment may include clients including a drone operator group 100, a remote expert group 102, and a projector user group 104, and a server 110 in charge of user request processing and service control.

Each of the clients 100 to 104 and the server 110 are connected to each other via a network to transmit and receive data in real time by wire or wirelessly.

Here, the network may include a wired/wireless Internet, a mobile communication network, a satellite network, etc.

FIG. 2 is a diagram illustrating a configuration of a drone operator group according to an embodiment.

As illustrated in FIG. 2, the drone operator group 100 may include a first-person view (FPV) drone 200 equipped with a stereo camera, a drone controller 202, a computer 204 for functions such as mixed reality rendering, remote communication, etc., and a head mounted display (HMD) 206 to experience a mixed reality environment from a drone view.

One or more drone operators may be included in the drone operator group 100, and know a basic controller operation method for drone flight. The drone operator performs a flight operation with the drone controller 202 while wearing an Oculus Quest HMD and an HP Omen VR Backpack computer.

In the case of a group consisting of multiple operators, all users need to hold and equip the corresponding devices.

The drone 200 may be provided to a module for short-range wireless communication to provide information captured by a stereo camera to a computer 204.

The computer 204 belonging to the drone operator group 100 may receive a flight training scenario and an annotation for flight training generated by a remote expert group to provide the received scenario and annotation to the drone operator. FIG. 3 is a diagram illustrating a configuration of a remote expert group according to an embodiment.

The remote expert group 102 may include a virtual reality (VR) HMD 300, a controller 302, and a computer 304.

The remote expert group has sufficient prior knowledge of operations of manipulating and performing the drone flight and serves to configure a virtual flight space in a space physically different from the drone operator and transmit appropriate instructions for the flight situation to the drone operator by using various remote communication tools.

The remote expert group may configure virtual flight spaces and flight training scenarios for drone flight by using the system while wearing a HTC Vive Pro HMD. FIG. 4 is a diagram illustrating a configuration of a projector user group according to an embodiment.

The projector user group 104 may include a VR table 400, a 3D projector 402, active shutter glasses 404, and a computer 406.

In the projector user group 104, one or more users may view the virtual flight space and the flight situation of the drone while wearing active shutter glass type 3D glasses using images projected from the 3D projector.

By a simple method of viewing images projected on a table while multiple users wear glasses, the users may check a 3D virtual flight space and a flight situation of the drone, and communicate with the drone operator or the remote expert group using microphones and speakers.

The server 110 includes a processor and a memory, and transmits data streams among the drone operator group 100, the remote expert group 102, and the projector user group 104.

The processor may include a central processing unit (CPU) capable of executing a computer program, other virtual machines, or the like.

The memory may include a nonvolatile storage device such as a fixed hard drive or a detachable storage device. The detachable storage device may include a compact flash unit, a USB memory stick, etc. The memory may also include volatile memories such as various types of random access memories.

According to an embodiment of the present disclosure, program instructions for remote training of drone flight in the mixed reality are stored in the memory.

In more detail, the program instructions according to the embodiment create a virtual flight space using arrangement information of one or more anchors and tags arranged in a physical space for flying a drone, and receives and registers a flight training scenario generated in a virtual flight space from the second computer 304 belonging to the remote expert group 102 that communicates remotely with the first computer 204 belonging to the drone operator group 100.

According to an embodiment of the present disclosure, one or more anchors and tags composed of ultra-wideband sensors are disposed in a physical space for flying a drone.

The server 110 generates a virtual flight space using the arrangement information of the anchors and tags arranged as described above.

The flight training scenario according to the embodiment includes one or more virtual obstacles and one or more flight instruction commands, and at least some of the flight instruction commands may be mapped to the one or more virtual obstacles.

In addition, the server 110 receives one or more annotations generated by the remote expert from the second computer and transmits the annotations to the first computer.

Hereinafter, a process of generating the virtual flight space and the flight training scenario according to the embodiment will be described in detail.

The remote expert group 102 generates a flight training scenario including virtual obstacles. Here, the flight training scenario may include a flight environment including virtual obstacles and a flight instruction having a predetermined sequence.

According to a preferred embodiment of the present disclosure, the remote expert group 102 may switch a view using a user interface.

FIG. 5 is a diagram illustrating an example of a view change according to an embodiment.

As illustrated in FIG. 5, the view may include an omniscient third-person view (TPV), a first-person view (FPV), and a drone operator proximity third-person view (Drone).

Further, the first-person view may include a near-range view (FPV-near) and a far-range view (FPV-FAR).

According to the embodiment, the following Equation 1 may be used when the view is switched.

$$\vec{S}(t; a, p, \vec{s_o}, \vec{s_d}) = \frac{t^a}{p^a}(\vec{s_d} - \vec{s_o}) + \vec{s_o}$$ [Equation 1]

Here, a is a speed of view change, p is a required time, and $\vec{s_o}$ is a starting view position vector, $\vec{s_d}$ is a destination view position vector, t is time.

When the above parameters are given, since a position vector in time t∈[1, p] is returned, 3D position coordinates for the view may be determined every frame.

In particular, if the parameter values are set to a=3.6 and p=1, the user's view may be gradually and naturally switched, and all vectors in Equation 1 are 3D position vectors.

A user interface of the remote expert group 102 may be ex-STnAD, which extends the Scenario Timeline and Attention Dock (STnAd).

The remote expert may design a flight training scenario that includes flight instructions in chronological order using the user interface and the controller.

FIG. 6 is a diagram illustrating a process of configuring a flight training scenario according to an embodiment.

FIG. 6 may be a process performed on the computer 304 belonging to the remote expert group 102.

Referring to FIG. 6, a scenario list is initialized (S600), and it is determined whether there is a request for adding a new scenario by the remote expert (S602).

If there is the request for adding the new scenario, a scenario to be added is inserted to the last position of the scenario list (S604).

Next, it is determined whether there is a request for generating an obstacle addition scenario (S606), and if there is the request for adding the virtual obstacle, a virtual obstacle is generated in a virtual flight space (S608).

Thereafter, the scenario and the virtual obstacle generated in S608 are mapped to each other (S610).

Next, obstacle-related information is transmitted to the server 110 and registered (S612).

In S606, if there is no obstacle addition request, it is determined whether the length of the scenario list is 1 (S614), and when the length of the scenario list is 1, annotation data of the remote expert is transmitted to the server 110 (S616).

The annotations will be described below in more detail.

FIG. 7 is a diagram illustrating a process of deleting and initializing the flight training scenario according to an embodiment.

Referring to FIG. 7, if the request of the remote expert is not the request for adding the new scenario in S602, it is determined whether the request is a request for deleting a scenario (S700).

If there is the scenario deletion request, it is determined whether or not an obstacle mapping scenario is deleted (S702).

If there is a request for deleting the obstacle mapping scenario, the obstacle mapping scenario is removed, and obstacle removal information is transmitted to the server 110 (S704).

Thereafter, the requested scenario is deleted from the scenario list (S706).

After deleting the scenario, it is determined whether the length of the list is greater than 0 (S708).

If the length of the scenario list is greater than 0, it is determined whether a first element of the scenario list is an obstacle mapping scenario (S710).

If the first element of the scenario list is the obstacle mapping scenario, the scenario is initialized (S712). Otherwise, the annotation data of the remote expert is transmitted to the server 110 (S714).

FIG. 8 is a diagram illustrating a process of generating a flight instruction scenario using a VR controller according to an embodiment.

Referring to FIG. 8, at least one icon 800 corresponding to the virtual obstacles and a flight instruction selection area 802 are provided in an interface for generating the flight instruction scenario.

The virtual obstacles may have various shapes, such as a circle, an oval, and a flag.

The remote expert may select one of the virtual obstacles using the VR controller.

In addition, the remote expert may select takeoff and landing, forward and backward movement, left and right rotation, etc. through the flight instruction selection area 802 in a drag-and-drop manner.

The selected icon or flight instruction is added to the scenario list area (804) on the lower end, and may be deleted according to the selection of the remote expert or the completion of the flight instruction.

When a virtual obstacle is added, since the virtual obstacle is placed in the virtual flight space to be connected in a pair with the icon 800 and is internally managed, when the icon 800 is removed from the user interface, the virtual obstacle is also eliminated.

FIG. 9 is a pseudo code illustrating a process of generating a flight training scenario and adding an object according to an embodiment of the present disclosure.

The remote expert may adjust a position of the virtual obstacle disposed in the virtual flight space by performing drag and drop using the controller 302. When a specific virtual obstacle is pointed by the controller 302 and dragged and lifted into the air while pressing a physical button, an auxiliary line indicating which point on the current ground the obstacle is disposed.

This auxiliary line is introduced to improve the limit of the user's perception for the 3D space, and is implemented to be rendered as a line segment using a perpendicular to the ground of the virtual obstacle. In this state, if the drop of releasing the physical button of the controller 302 is performed, the auxiliary line is placed at a position corresponding to the foot of the perpendicular. The position coordinate data of the changed virtual obstacle is transmitted and synchronized to all other users through the server 110.

Communication between the components according to the embodiment may include a text annotation, an icon annotation, a dot annotation, a flight path guideline, a voice, etc.

The other types except for the voice are transmitted to the drone operator only through the interaction of the remote expert.

The text annotation is a communication method for transmitting the flight instructions of the remote expert in a text format.

The icon annotation operates in such a manner, but it is used when visual communication in the form of a picture is effective, such as when requiring the attention.

The dot annotation is a communication method capable of being requested by the operator to pay attention to a specific location in the flight view.

The remote expert may perform the dot annotation by selecting a screen disposed in a far-field of the virtual flight space with the controller 302.

A real-time image of a stereo camera mounted on the drone 200 is streamed and displayed on the screen belonging to the remote expert group 102, and the remote expert may check the flight environment and give appropriate instructions through this.

When a specific position on the enlarged virtual screen is pointed to by a laser pointer of the controller 302, a dot-shaped pointer is synchronized and displayed at the same position even in the HMD 206 of the drone operator.

At this time, the virtual screen belonging to the remote expert group 102 is in the form of a curved surface transformed from a 2D plane, but since the view of the drone operator is a 3D space, it is required to appropriately switch the position coordinates of the pointer.

FIG. 10 is a diagram illustrating that planar coordinates on a virtual screen are converted into appropriate 3D spatial coordinates in consideration of a view frustum visible on an HMD of a drone controller.

When the remote expert selects the enlarged virtual screen once again with the controller 302, the enlarged virtual screen returns to a previous state and the dot annotation is stopped.

The flight path guideline is a communication method that visually transmits the intention of an expert by expressing the flight path of a drone recommended for the drone operator in a virtual space as a smooth 3D curve.

The remote expert may activate a flight path recording function provided by an ex-STnAD interface at the first-person view and draw a 3D curve in the space by moving the virtual drone using the controller 302. This curve is configured by recording the position coordinates of the virtual drone at every short time interval and connecting adjacent dots with a line segment, which is repeatedly performed until the flight path recording is paused.

The voice is the most common and effective communication method, and unlike the methods presented above, the voice is characterized by depending on hearing rather than sight.

The virtual flight space for drone training according to the embodiment may be configured using a plurality of ultra-wideband (UWB) sensors.

FIG. 11 is a diagram illustrating a state in which ultra-wideband sensors according to an embodiment are arranged in a physical space and FIG. 12 is a diagram illustrating an overall pipeline configuring a virtual flight space by arranging ultra-wideband sensors in a physical space according to an embodiment.

Referring to FIGS. 11 and 12, the plurality of sensors are divided into one or more anchors and tags according to their roles.

One or more anchors set a boundary of the virtual flight space, and one or more tags correspond to the one or more virtual obstacles.

The sensors estimate a distance to the tagged sensor by calculating a round-trip time (RTT) for sending and receiving data in a 4-Way Handshake method, and the distance data is processed by a Raspberry Pi board to which the sensor is connected to be transmitted to the server 110.

In the server 110, the coordinate data of the anchors mapped to the appropriate position in the virtual flight space and the distance data to the tag estimated from each anchor are calculated by using a multivariate survey method and a Nelder-Mead optimization method to determine a spatial coordinate (position vector) of the tag.

Since the process of estimating the spatial coordinates of the tag using the UWB sensor is repeated over time, the calculated data has a characteristic of a time series, and cannot be moved with a very large distance due to a time interval and physical movement characteristics of an object. That is, since the time series data for the spatial coordinates of the sensor moves from a position of the previous time, a motion of a certain value or more results in the occurrence of spatial coordinate estimation errors.

These errors may cause a problem of deteriorating the immersion of a user experiencing a virtual reality and a mixed reality. In order to minimize this, an operation of correcting the estimated spatial coordinates using a variable length sliding window and a modified weighted moving average is performed as follows.

FIG. 13 is a diagram illustrating a sliding window operation process for correcting a position vector of a tag according to an embodiment.

FIG. 13 illustrates a process of obtaining a position vector $\overrightarrow{P_t^*}$ corrected by using a variable length sliding window method for a position vector $\overrightarrow{P_t}$ of a tag in a Unity virtual space estimated by using data from the UWB sensor at a time point $t \in [0, \infty)$.

At this time, if the size of $|\overrightarrow{P_t}-\overrightarrow{P_{t-1}}|$, which is a scalar quantity of $\overrightarrow{P_t}-\overrightarrow{P_{t-1}}$, is smaller than a preset threshold value $\epsilon$, as in Case (1) of FIG. 13, the weighted moving average operation of Equation 2 below is performed by sliding while maintaining the same window size as in the previous step.

$$\overrightarrow{P_t^*} = \sum_{k=1}^{w} \frac{2^{w-k}}{2^w - 1} \overrightarrow{P_{t-k+1}}$$ [Equation 2]

Here, $w \in [3, \infty)$ represents the window size.

This correction of the position vector is performed by the server 110, and when a difference in size between the position vectors of tags in adjacent periods to each other is less than the preset threshold value, the server 110 corrects the position vector by performing a weighted moving average of only one or more previous position vectors while maintaining the same size of the window as before.

On the contrary, if the size $|\overrightarrow{P_t}-\overrightarrow{P_{t-1}}|$ is larger than the preset threshold value $\epsilon$, as illustrated in Case (2) of FIG. 13, the window size is increased by 1, $\overrightarrow{P_t}$ is included in the window, and then $\overrightarrow{P_t^*}$ is derived by applying the modified weighted moving average as illustrated in Equation 3 below.

$$\overrightarrow{P_t^*} = \frac{2^{w-1} - (w-3)(w-1)}{2^w - 1} \overrightarrow{P_t} + \sum_{k=2}^{w} \frac{2^{w-k} + w - 3}{2^w - 1} \overrightarrow{P_{t-k+1}}$$ [Equation 3]

If time elapses and the process of Case (2) is repeatedly performed, the window size continues to increase, and thus, even if the estimation of the spatial coordinate position of the sensor is stabilized, there is a possibility that the computing device may have to process a large amount of computation.

Accordingly, as illustrated in FIG. 14, when the position estimation of the sensor stabilizes for a certain period of time over time, the window size is reduced by 1, but the window size cannot be smaller than 3.

According to the embodiment, the server 110 sequentially increases the size of the window when the difference in the size between the position vectors of the tags is greater than a preset threshold value, and performs a weighted moving average of the current position vector and one or more previous position vectors to correct the position vector.

Since that fact that the difference in the size of the position vectors of the tags is greater than the preset threshold value may mean that the error of the current position vector is large, the server 110 determines the weight of the current position vector in the next period equal to or smaller than the weight of the previous position vector.

Through this process, the time series data of the position vector $\overrightarrow{P_t^*}$ (however, $t \in [0, \infty)$) in the virtual space of the tag in which the spatial coordinate is estimated and corrected is transmitted to all users of the remote training system in real time.

All of the users may experience the same flight environment because the changes are immediately reflected on the virtual space depending on the purpose of the predefined tag.

The embodiments of the present disclosure described above are disclosed for purposes of illustration, and it will be apparent to those skilled in the art that various modifications, additions, and substitutions are possible within the spirit and scope of the present disclosure and these modifications, changes, and additions should be considered as falling within the scope of the following claims.

What is claimed is:

1. A remote training apparatus for a drone flight in a mixed reality comprising:
   a processor; and
   a memory including the processor,
   wherein the memory stores program instructions executable by the processor to generate a virtual flight space using arrangement information of one or more anchors and tags arranged in a physical space for the drone flight, and
   receive and register a flight training scenario generated in the virtual flight space from a second computer belonging to a remote expert group that remotely communicates with a first computer belonging to a drone operator group,
   wherein the flight training scenario includes one or more virtual obstacles and one or more flight instruction commands, and at least some of the flight instruction commands are mapped to the one or more virtual obstacles, and receive one or more annotations generated by the remote expert group from the second computer to transmit the one or more annotations to the first computer.

2. The remote training apparatus for the drone flight of claim 1, wherein the one or more anchors set a boundary of the virtual flight space, and
   the one or more tags correspond to the one or more virtual obstacles.

3. The remote training apparatus for the drone flight of claim 1, wherein the first computer communicates with a first-person view (FPV) drone equipped with a stereo camera and a head mounted display for providing a mixed reality environment of a drone view to the drone operator group.

4. The remote training apparatus for the drone flight of claim 1, wherein the second computer communicates with a head mounted display for providing a mixed reality environment of a drone view to the remote expert group and a controller for generating the flight training scenario and the one or more annotations, and provides a user interface for generating the flight training scenario and the one or more annotations.

5. The remote training apparatus for the drone flight of claim 4, wherein the user interface includes one or more icons corresponding to the one or more virtual obstacles, a flight instruction selection area, and a scenario list area including a virtual obstacle and a flight instruction command selected by the remote expert group.

6. The remote training apparatus for the drone flight of claim 1, wherein the one or more anchors and tags are ultra-wideband sensors, and
   the program instructions estimate position vectors of the tags in the virtual flight space at a preset time period, and correct the position vectors by using a variable length sliding window and a modified weighted moving average.

7. The remote training apparatus for the drone flight of claim 6, wherein when a difference in size between the position vectors in adjacent periods to each other is less than a preset threshold value, the program instructions correct the position vectors by performing a weighted moving average of only one or more previous position vectors while maintaining the same size of the window as before.

8. The remote training apparatus for the drone flight of claim 6, wherein when a difference in size between the position vectors is greater than a preset threshold value, the program instructions sequentially increase size of the window and perform a weighted moving average of current position vector and one or more previous position vectors to correct the position vectors.

9. The remote training apparatus for the drone flight of claim 8, wherein the program instructions determine weight of the current position vector to be equal to or smaller than weight of the previous position vector.

10. The remote training apparatus for the drone flight of claim 9, wherein when a case where the difference in size between the position vectors is less than the preset threshold value occurs for a predetermined time period or more, the program instructions sequentially decrease the increased size of the window.

11. A remote training method for a drone flight in a mixed reality in an apparatus including a processor and a memory, the remote training method comprising the steps of:
generating a virtual flight space using arrangement information of one or more anchors and tags arranged in a physical space for the drone flight;
receiving and registering a flight training scenario generated in the virtual flight space from a second computer belonging to a remote expert group that remotely communicates with a first computer belonging to a drone operator group; and
receiving one or more annotations generated by the remote expert group from the second computer to transmit the annotations to the first computer,
wherein the flight training scenario includes one or more virtual obstacles and one or more flight instruction commands, and at least some of the flight instruction commands are mapped to the one or more virtual obstacles.

12. A non-transitory computer readable recording medium performing the method according to claim 11.

* * * * *